(12) United States Patent
Atsuchi

(10) Patent No.: US 11,513,587 B2
(45) Date of Patent: Nov. 29, 2022

(54) HEAD-MOUNTED DISPLAY DEVICE AND DISPLAY SYSTEM

(71) Applicant: SEIKO EPSON CORPORATION, Tokyo (JP)

(72) Inventor: Robina Atsuchi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 648 days.

(21) Appl. No.: 16/537,703

(22) Filed: Aug. 12, 2019

(65) Prior Publication Data
US 2020/0050260 A1 Feb. 13, 2020

(30) Foreign Application Priority Data

Aug. 13, 2018 (JP) .............................. JP2018-152373

(51) Int. Cl.
| | |
|---|---|
| *G06F 3/01* | (2006.01) |
| *G06F 21/32* | (2013.01) |
| *G09G 5/36* | (2006.01) |
| *G02B 27/01* | (2006.01) |
| *G06F 1/16* | (2006.01) |
| *G06V 40/12* | (2022.01) |

(52) U.S. Cl.
CPC .......... *G06F 3/011* (2013.01); *G02B 27/0172* (2013.01); *G06F 21/32* (2013.01); *G09G 5/36* (2013.01); *G02B 2027/014* (2013.01); *G06F 1/1613* (2013.01); *G06V 40/1365* (2022.01); *G09G 2354/00* (2013.01)

(58) Field of Classification Search
CPC .......... G06F 3/011; G06F 3/012; G06F 3/147; G06F 1/1613; G06F 1/163; G06F 1/3231; G06F 1/3265; G06F 1/3287; G09G 5/36; G09G 2354/00; G09G 2320/0261; G09G 2358/00; G02B 27/0172; G02B 27/0176; G02B 2027/014; G02B 2027/0178
See application file for complete search history.

(56) References Cited

U.S. PATENT DOCUMENTS

| | | | | |
|---|---|---|---|---|
| 2013/0021225 | A1* | 1/2013 | Braun | G02B 27/017 340/3.1 |
| 2016/0358181 | A1* | 12/2016 | Bradski | H04L 63/0861 |
| 2017/0277222 | A1* | 9/2017 | Matsuzawa | G06F 3/011 |
| 2017/0337352 | A1* | 11/2017 | Williams | G06F 21/10 |
| 2018/0322681 | A1* | 11/2018 | Inomata | A63F 13/35 |
| 2019/0392163 | A1* | 12/2019 | Lake | G09G 3/002 |

FOREIGN PATENT DOCUMENTS

| | | |
|---|---|---|
| JP | 2016-512639 A | 4/2016 |
| WO | 2014/163890 A1 | 10/2014 |
| WO | 2016/199699 A1 | 12/2016 |

* cited by examiner

*Primary Examiner* — Ryan A Lubit
(74) *Attorney, Agent, or Firm* — Oliff PLC

(57) ABSTRACT

A head-mounted display device includes a mounting portion configured to be attached to a head of a user, an image display unit disposed in the mounting portion and configured to display an image to be visually recognized by the user, a state detection unit configured to detect a first state in which the mounting portion is attached to the head and a second state in which the mounting portion is detached from the head, and a display control unit configured to cause the image display unit to stop displaying an image when the state detection unit detects the second state.

7 Claims, 8 Drawing Sheets

HEAD-MOUNTED DISPLAY DEVICE AND DISPLAY SYSTEM

The present application is based on, and claims priority from JP Application Serial Number 2018-152373, filed Aug. 13, 2018, the disclosure of which is hereby incorporated by reference herein in its entirety.

BACKGROUND

1. Technical Field

The present disclosure relates to a head-mounted display device and a display system.

2. Related Art

A head-mounted displays configured to be mounted on a user and display an image in front of the eyes of a user is proposed. WO 2016/199699 discloses a video display system including a head-mounted display and a control device configured to control the head-mounted display. In the video display system, in order to provide a suitable viewing environment, the control device outputs a video signal to the head-mounted display upon detecting that the head-mounted display is mounted, and the control device restricts the output of the image signal to the head-mounted display upon detecting that the head-mounted display is unmounted.

However, the video display system disclosed in WO 2016/199699, in which the video signal is output to the head-mounted display upon detecting that the head-mounted display is mounted, has a security problem in which after the head mount display is unmounted from an owner of the head mount display and then left behind, anyone other than the owner can visually recognize the video on the head-mounted display.

SUMMARY

According to an aspect of a head-mounted display device of the present disclosure, the head-mounted display device includes a mounting portion configured to be attached to a head of a user, an image display unit disposed in the mounting portion and configured to display an image to be visually recognized by the user, a state detection unit configured to detect a first state in which the mounting portion is attached to the head and a second state in which the mounting portion is detached from the head, and a display control unit configured to cause the image display unit to stop displaying an image when the state detection unit detects the second state.

Further, according to an aspect of a display system of the present disclosure, the display system includes a head-mounted display device configured to be attached to a head of a user, and a server configured to communicate with the head-mounted display device and provide various information to the head-mounted display device. In the display system, the head-mounted display device includes an image display unit configured to display an image to be visually recognized by the user, a state detection unit configured to detect a first state in which the head-mounted display device is attached to the head and a second state in which the head-mounted display device is detached from the head, and an information transmission unit configured to transmit unmount information indicating the second state, when the state detection unit detects the second state, and the server includes a management unit configured to restrict access by the head-mounted display device to the various information when the server receives the unmount information transmitted from the information transmission unit.

DESCRIPTION OF EXEMPLARY EMBODIMENTS

Figure 1:
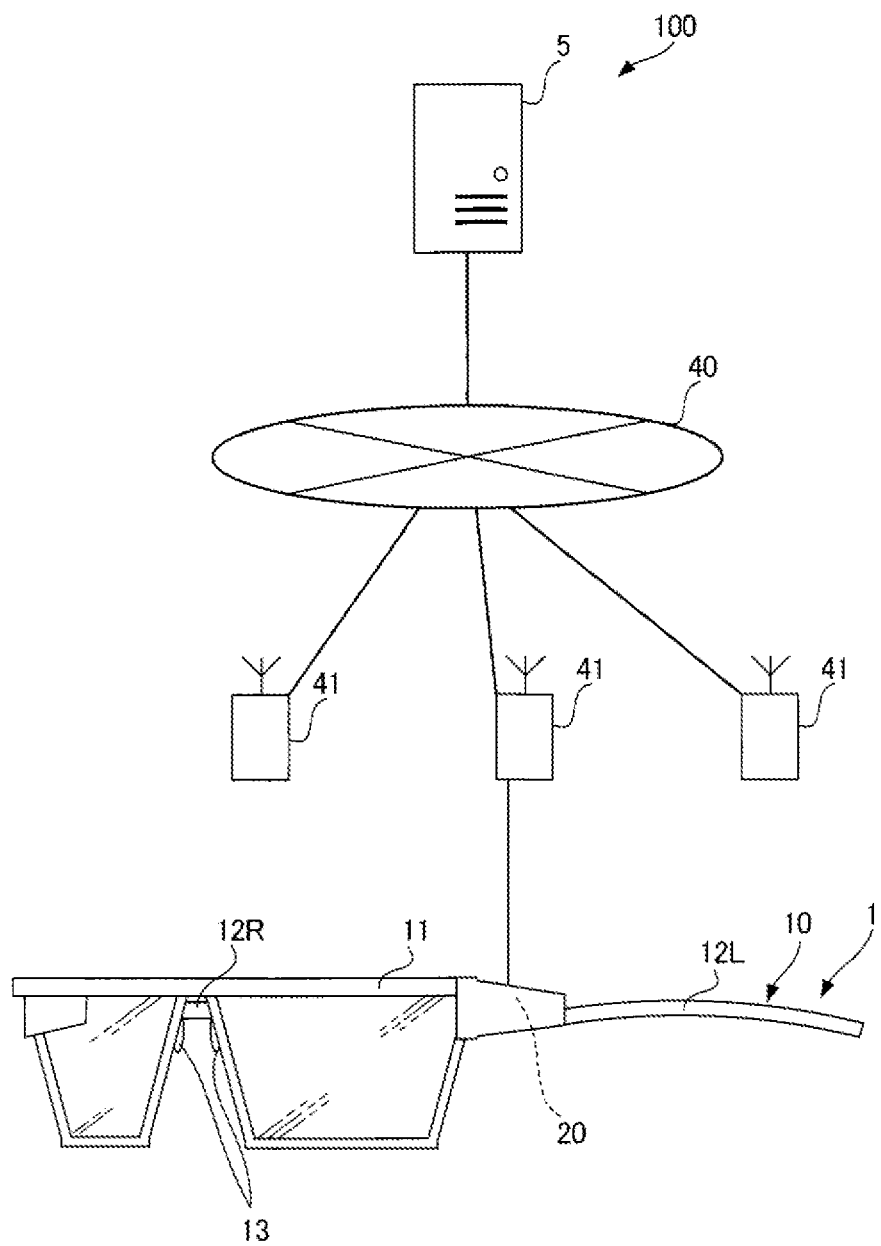
FIG. 1 is a conceptual diagram illustrating a display system according to a first embodiment.

Preferred embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, note that the scope of the present disclosure is not limited to these embodiments unless otherwise stated to limit the disclosure in the following descriptions.

1. First Embodiment 1-1. Overall Configuration of Display System

FIG. 1 is a conceptual diagram illustrating a display system according to a first embodiment. The display system 100 includes a display device 1 being an example of a "head-mounted display apparatus", and a server 5 configured to provide various information to the display device 1. The server 5 is connected to a network 40 via a communication line. A plurality of radio devices 41 including access points are connected to the network 40, and the display device 1 is connected to the network 40 via the radio devices 41.

Note that the server 5 may be a cloud server on the network 40. Furthermore, the network configuration between the display device 1 and the server 5 is not particularly limited as long as communication between the display device 1 and the server 5 can be ensured. For example, data communication between the display device 1 and the server 5 may be directly performed without using the network 40. In the figure, the display device 1 and the server 5 are each singular; however, may be each plural.

The display device 1 illustrated in FIG. 1 is a see-through head-mounted display (HMD) configured to be mounted on a head of a user. The display device 1 allows a user to view an image visually recognizable by the user with a view of an external environment superimposed on the image. Note that the display device 1 is not limited to a see-through type display device, and the display device 1 may be a non-see-through type display device.

The display device 1 has an appearance similar to an eyeglass frame, and includes a mounting portion 10 configured to be attached to a head of a user. The mounting portion 10 includes a front portion 11 including rims and a bridge, and a pair of temples 12R and 12L extending from opposite sides of the front portion 11. Further, nose pads 13 are provided in the front portion 11. The nose pads 13 abut the nose of the user when the display device 1 is mounted on the head of the user. The nose pads 13 and the temples 12R and 12L allow for holding the display device 1 on the head of the user. Note that the "mounting portion" is not limited to the configuration illustrated in the drawings, as long as the mounting portion can be attached to the head of the user.

The display system 100 may be utilized in any manner according to the intent of the user. For example, the display system 100 may be used for security services. In this case, the display device 1 allows the user to visually recognize an image representing a map including a location to be under guard or an image representing a database of dangerous persons. Further, the display device 1 can be used in a factory or medical facility, for example. For example, when being used in a factory, the display device 1 allows the user to visually recognize an image representing contents relating to equipment installed in the factory or an image representing a map of the factory with a view of the external environment superimposed on the image. For example, when being used in a medical facility, the display device 1 allows the user to visually recognize an image representing medical data of a patient or an image representing contents relating to a medical device with a view of external environment superimposed on the image.

Figure 2:
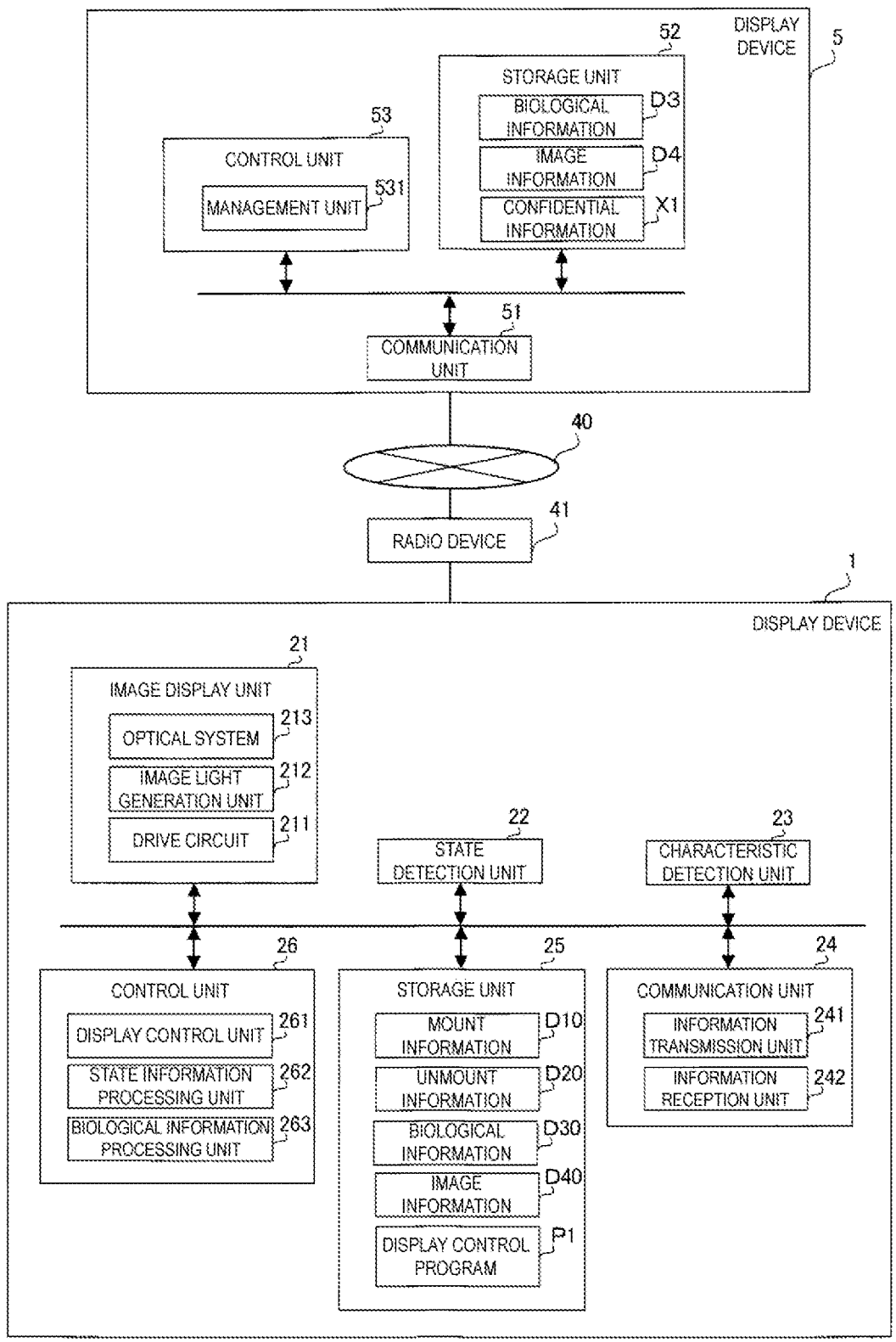
FIG. 2 is a block diagram illustrating a configuration of the display system according to the first embodiment.

FIG. 2 is a block diagram illustrating a configuration of the display system according to the first embodiment.

1-1A. Display Device

The display device 1 includes an image display unit 21, a state detection unit 22, a characteristic detection unit 23, a communication unit 24, a storage unit 25, and a control unit 26. These units are provided in the mounting portion 10 described above. Although not illustrated in the drawings, the display device 1 includes a battery including a secondary battery such as a lithium-ion secondary battery, and a power supply circuit configured to supply power from the battery to the control unit 26 and the like. The units included in the display device 1 will be described below.

1-1Aa. Image Display Unit

The image display unit 21 includes a drive circuit 211, an image light generation unit 212, and an optical system 213. The image display unit 21 is configured to generate image light. The user can visually recognize an image formed by the image light.

The drive circuit 211 is configured to drive the image light generation unit 212. The drive circuit 211 is configured to supply a control signal and a drive signal to the image light generation unit 212. The image light generation unit 212 is configured to emit image light to the optical system 213. The image light generation unit 212 is configured to include, for example, an EL display panel including an organic Electroluminescence (EL) element or an inorganic EL element as a light emitting element. Note that the image light generation unit 212 may have a configuration including, for example, a light source such as a light emitting diode (LED) and a liquid crystal display panel including liquid crystal. Further, the image light generation unit 212 may have a configuration including a plurality of semiconductor lasers each configured to emit red (R), green (G), or blue (B) light, and a light scanner configured to scan the light from the semiconductor lasers, for example.

Further, the optical system 213 serves to direct the image light to the eye of the user. The optical system 213 includes a lens such as a half mirror.

1-1Ab. State Detection Unit

The state detection unit 22 is configured to detect a first state in which the mounting portion 10 is attached to the head of the user and a second state in which the mounting portion 10 is detached from the head.

The state detection unit 22 is configured to include, for example, a proximity sensor configured to detect the proximity of the user to the display device 1. Examples of the detection system employed in the proximity sensor include a detection system using electromagnetic induction and a system based on detection of a change in capacitance. The state detection units 22 are provided respectively near the front portions 11 on the temple portions 12L and 12R of the mounting portion 10, as illustrated in FIG. 1, for example. The detection distance of the state detection unit 22 is, for example, about 1 mm or more and 10 mm or less.

As described above, the state detection unit 22 is configured to detect the first state and the second state. In other words, the state detection unit 22 is configured to output a signal corresponding to the first state and a signal corresponding to the second state. For example, signal output above a predetermined reference value corresponds to detection of the first state, and signal output equal to or less than the reference value corresponds to detection of the second state. Note that presence and absence of signal output may correspond to detection of the first state and the second state, respectively.

Note that the state detection unit 22 is not limited to a configuration including a proximity sensor, and may have any configuration as long as the user can detect the first state and the second state of the display device 1. For example, the state detection unit 22 may be configured to include a light curtain configured so that light is obstructed when the display device 1 is mounted on a user.

1-1Ac. Characteristic Detection Unit

The characteristic detection unit 23 is configured to detect a biological characteristic of the user. The biological characteristic is a characteristic relating to the body or the like of the user, which is used to authenticate the user, and may include the fingerprint, face, iris, and voice of the user, for example.

Examples of the characteristic detection unit 23 include a fingerprint detector for reading a fingerprint, a Charge Coupled Device (CCD) camera for capturing a face or an eye, and a microphone for acquiring voice. In particular, the characteristic detection unit 23 may be a fingerprint detector. This is because the fingerprint detector is more suitable to achieve an inexpensive and compact configuration, compared to other devices for detecting other biological characteristics other than fingerprints. Examples of fingerprint detectors include devices utilizing differences in capacitance caused by unevenness in a fingerprint, and devices utilizing reflection of light caused by unevenness in a fingerprint, and the like. When the characteristic detection unit 23 is a fingerprint detector, reading units of the characteristic detection units 23 configured to read a fingerprint are provided respectively, for example, on the temple portions 12L and 12R of the mounting portion 10.

Note that the characteristic detection unit 23 may not include a single device, and may include a plurality of devices. For example, the characteristic detection unit 23 may include a fingerprint detector and a CCD camera.

Further, the display device 1 may include a temperature sensor for measuring temperature, a humidity sensor for sensing humidity, an acceleration sensor for detecting acceleration, a gyro sensor for measuring angular velocity, a geomagnetic sensor for detecting the geomagnetic field, and the like. Furthermore, these sensors may be used as the state detection unit 22 or the characteristic detection unit 23 described above.

1-1Ad. Communication Unit

The communication unit 24 is an interface (I/F) for connecting the display device to the network 40 via the radio device 41, for example, by using Wi-Fi or the like. Note that Wi-Fi is a registered trademark. The communication unit 24 is configured to include, for example, a radio LAN module.

The communication unit 24 includes an information transmission unit 241 configured to transmit various information to the server 5, and an information reception unit 242 configured to acquire various information from the server 5. When the above-described state detection unit 22 detects the first state, the information transmission unit 241 transmits mount information D10 to the server 5. The mount information D10 is information indicating the first state in which the display device 1 is attached to the user. In addition, when the above-described state detection unit 22 detects the second state, the information transmission unit 241 transmits unmount information D20 to the server 5. The unmount information D20 is information indicating the second state in which the display device 1 is detached from the user. Further, the information transmission unit 241 is configured to transmit biological information D30 based on the biological characteristic detected by the characteristic detection unit 23.

1-1Ae. Storage Unit

The storage unit 25 is a recording medium readable by the control unit 26, and is configured to store a plurality of programs executed by the control unit 26, various types of data used by the control unit 26, and the like. Specifically, the storage unit 25 stores the mount information D10, the unmount information D20, the biological information D30, and image information D40. The image information D40 is information stored in advance in the storage unit 25, and the storage unit 25 may further store various information provided from the server 5. The storage unit 25 stores a display control program P1 for performing display control described below.

The storage unit 25 includes one or more storage circuits including, for example, Read Only Memory (ROM), Erasable Programmable ROM (EPROM), Electrically Erasable Programmable ROM (EEPROM), Random Access Memory (RAM), and the like.

1-1Af. Control Unit

The control unit 26 is configured to perform various processes including control and operation of the units of the display device 1. The control unit 26 is a processor such as a central processing unit (CPU), for example. The control unit 26 functions as a display control unit 261, a state information processing unit 262, and a biological information processing unit 263 by executing the display control program P1 stored in the storage unit 25.

The display control unit 261 is configured to generate an image signal based on the image information D40 stored in the storage unit 25 or various information provided from the server 5, and supply the image signal to the drive circuit 211. Note that, under the control of the display control unit 261, the above-described drive circuit 211 supplies a control signal based on that image signal to the image light generation unit 212. The state information processing unit 262 is configured to generate the mount information D10 based on the signal corresponding to the first state output from the state detection unit 22. Further, the state information processing unit 262 is also configured to generate the unmount information D20 based on the signal corresponding to the second state output from the state detection unit 22. The biological information processing unit 263 is configured to generate the biological information D30 based on the biological characteristic output from the characteristic detection unit 23.

1-1B. Server

The server 5 includes a communication unit 51, a storage unit 52, and a control unit 53. The server 5 provides various information such as confidential information X1 to the display device 1. The confidential information X1 is information that is permitted to be disclosed only to an authentic user having an access right to the confidential information X1. For example, when the display system 100 is used for security services, examples of the confidential information X1 may include image information representing a map including a location to be under guard, and image information representing a database of dangerous persons.

1-1Ba. Communication Unit

The communication unit 51 is configured to include, for example, a LAN card or the like. The communication unit 51 has a function of providing various information including confidential information X1, to the display device 1, and a function of receiving various information including the biological information D30, from the display device 1.

1-1Bb. Storage Unit

The storage unit 52 is a recording medium readable by the control unit 53, and is configured to store a plurality of programs executed by the control unit 53, various types of data used by the control unit 53, and the like. Specifically, the storage unit 52 stores the biological information D3 and the confidential information X1. Here, the biological information D3 stored in the server 5 is information that is included in the biological information D30 transmitted from the display device 1 and associated with an authentic user having an access right to the confidential information X1. Thus, the above-described biological information D30 includes the biological information D3 of the authentic user and biological information of other persons.

Note that the storage unit 52, similarly to the storage unit 25 described above, includes one or more types of storage circuits. Further, when the server 5 is connected to a plurality of display devices 1, the storage unit 52 stores the biological information D3 for each of the display devices 1.

1-1Bc. Control Unit

The control unit 53 is configured to perform various processes including control and operation of the units of the server 5. The control unit 53 is a processor such as a central processing unit (CPU), for example. Further, the control unit 53 functions as a management unit 531.

The management unit 531 is configured to determine the authenticity of a user of the display device 1. Specifically, the management unit 531 determines the authenticity of the user based on the biological information D30 transmitted from the aforementioned information transmission unit 241 and the biological information D3 stored in the storage unit 52. Furthermore, the management unit 531 is configured to permit or restrict access to the confidential information X1 by the display device 1 based on the authenticity determination result. Specifically, when determining that the user is authentic, the management unit 531 permits access to the confidential information X1 by the display device 1. On the other hand, when determining that the user is not authentic, the management unit 531 restricts access to the confidential information X1 by the display device 1. In addition, when the communication unit 51 receives the unmount information D20 transmitted from the above-described information transmission unit 241, the management unit 531 restricts access to the confidential information X1 by the display device 1.

1-2. Display Control Method by Display System

Figure 3:
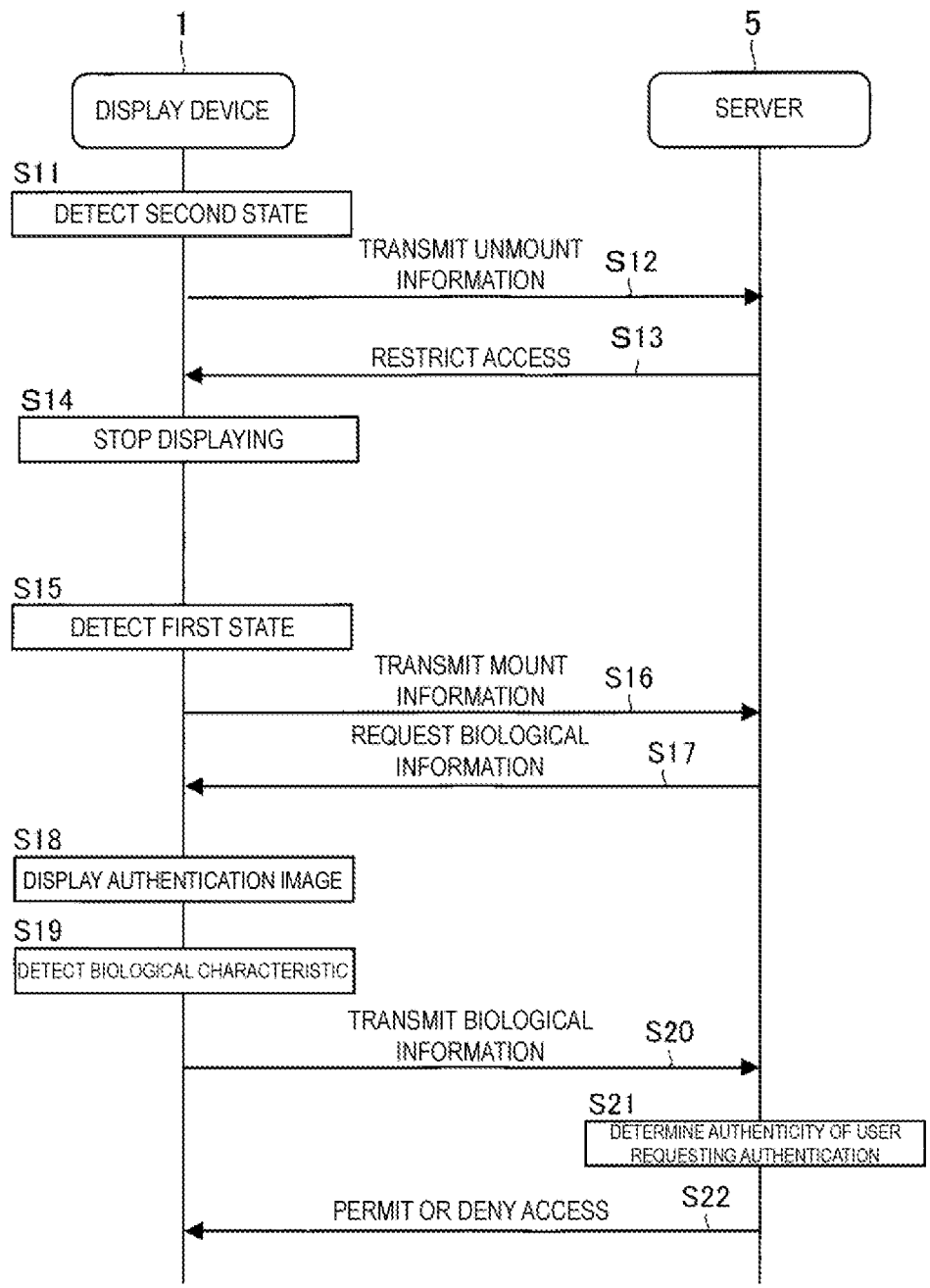
FIG. 3 is a sequence chart for illustrating a display control method in the first embodiment.

FIG. 3 is a sequence chart for illustrating a display control method in the first embodiment. The control unit 26 of the display device 1 reads out and executes the display control program P1 stored in the storage unit 25 to achieve the various processes in the display control method described below. The server 5 performs various processes in response to requests from the display device 1. Note that, in the following explanation of the display control by the display system 100, it is assumed that the display device 1 has been attached to the user prior to step S11. Further, it is assumed that prior to step S11, the display device 1 is capable of displaying an image based on the confidential information X1 provided from the server 5 and an image based on the image information D40 stored in the storage unit 25.

First, when the state detection unit 22 of the display device 1 detects the second state in step S11 illustrated in FIG. 3, the state information processing unit 262 generates the unmount information D20, and in step S12, the information transmission unit 241 of the display device 1 transmits the unmount information D20 to the server 5.

Next, the communication unit 51 of the server 5 receives the unmount information D20, and in response to the reception, the management unit 531 of the server 5 restricts access to the confidential information X1 by the display device 1, in step S13.

Then, in response to the access restriction, the display control unit 261 of the display device 1 stops displaying the image, in step S14. "Stopping displaying the image" means that the display control unit 261 stops providing the image signal to the image display unit 21, and the image display unit 21 does not display any image. Thus, once the display of the image stops, the user cannot visually recognize both the image based on the confidential information X1 provided from the server 5 and the image based on the image information D40 stored in the storage unit 25.

Then, when the state detection unit 22 of the display device 1 detects the first state in step S15, the state information processing unit 262 generates the mount information D10, and in step S16, the information transmission unit 241 of the display device 1 transmits the mount information D10 to the server 5.

Next, in response to acquiring the mount information D10 by the communication unit 51, the management unit 531 of the server 5 requests the display device 1 to provide the biological information D30 to be used for authentication, in step S17. When the information reception unit 242 of the display device 1 receives the request, the image display unit 21 of the display device 1 displays an authentication image under the control of the display control unit 261 in step S18. The authentication image is an image required to access various information including the confidential information X1, and is an image for prompting the user to perform operation for authentication. For example, when a user is authenticated based on fingerprint authentication, the authentication image represents a content for prompting the user to touch a fingerprint detector of the characteristic detection unit 23 with the finger of the user in order to perform fingerprint authentication. Note that, in step S18, the display control unit 261 still stops displaying any images other than the authentication image to be displayed.

Next, in step S19, the characteristic detection unit 23 of the display device 1 detects a biological characteristic of the user, and then the characteristic detection unit 23 generates the biological information D30 based on the biological characteristic.

Next, in step S20, the information transmission unit 241 of the display device 1 transmits the biological information D30 to the server 5, and then, in step S21, the management unit 531 of the server 5 determines the authenticity of the user. The management unit 531 determines the authenticity of the user who currently attaches the display device 1 based on whether or not the biological information D30 received by the communication unit 51 is identical to the biological information D3 already recorded in the storage unit 52. When the biological information D30 and the biological information D3 are identical, the user is determined as an authentic user. On the other hand, when the biological information D30 and the biological information D3 are not identical, the user is determined as a non-authentic user.

Then, in step S22, based on the authenticity determination result, the management unit 531 of the server 5 permits or denies access to the confidential information X1. When the management unit 531 determines that the user is authentic in step S21, the management unit 531 permits access by the display device 1. When the access is permitted, the image display unit 21 of the display device 1 can display images under the control of the display control unit 261. Thus, the display device 1 can display both an image based on the confidential information X1 provided from the server 5 and an image based on the image information D40 stored in the storage unit 25. On the other hand, when the management unit 531 determines that the user is not authentic in step S21, the management unit 531 denies access by the display device 1. In other words, the management unit 531 continues to restrict access by the display device 1.

As described above, the display device 1 includes the mounting portion 10 configured to be attached to the head of a user, the image display unit 21 disposed in the mounting portion 10 and configured to display an image to be visually recognized by the user, the state detection unit 22 configured to detect a first state in which the mounting portion 10 is attached to the head and a second state in which the mounting portion 10 is detached from the head, and the display control unit 261 configured to, when the state detection unit 22 detects the second state, cause the image display unit 21 to stop displaying the image. According to the embodiment, as described above, when the state detection unit 22 detects the second state in step S11, the display control unit 261 stops displaying the image in step S14.

According to the display device 1, even when the display device 1 is detached from a user and then attached to another user, the image is no longer displayed so that the other user cannot visually recognize the image. Therefore, security of the display device 1 can be enhanced. Thus, the information may be possibly prevented from being peeked at because the other user cannot visually recognize the image on the display device 1.

Furthermore, as described above, the display device 1 further includes an information transmission unit 241 configured to, when the state detection unit 22 detects the second state, transmit the unmount information indicating the second state.

The information transmission unit 241 provided in the display device 1 allows for providing the unmount information D20 to a device other than the display device 1. Therefore, the device other than the display device 1 can utilize the unmount information D20.

In the embodiment, the above-described device other than the display device 1 corresponds to the server 5. The server 5 includes the management unit 531 configured to restrict access to various information in the server 5 by the display device 1, when receiving the unmount information D20 transmitted from the information transmission unit 241. In the embodiment, in response to the transmission of the unmount information D20 in step S12, the management unit 531 restricts access to the confidential information X1 by the display device 1 in step S13.

The server 5 includes the management unit 531 to allow for utilizing the unmount information D20 transmitted by the information transmission unit 241. Specifically, the management unit 531 can utilize the unmount information D20 as a trigger for access restriction, and can restrict, based on the unmount information D20, access to the confidential information X1. Therefore, security of the display system 100 can be further enhanced. Thus, the confidential information X1 provided from the server 5 may be possibly prevented from being peeked at.

Note that the above-described device other than the display device 1 is not limited to the server 5. In other words, the information transmission unit 241 may transmit the unmount information D20 to a device other than the server 5. For example, the information transmission unit 241 may transmit the unmount information D20 to a user's mobile terminal such as a smartphone. In this case, for example, when the state detection unit 22 detects the second state and the display stops under the control of the display control unit 261, the information transmission unit 241 transmits, to the mobile terminal, the unmount information D20 and information indicating that the display has stopped. The information is received at the mobile terminal to inform the user that the display in the display device 1 has stopped due to the occurrence of the second state. Therefore, the user can confirm that the security and safety of the display device 1 is ensured.

As described above, the display device 1 further includes a characteristic detection unit 23 configured to detect a biological characteristic of a user.

The characteristic detection unit 23 included in the display system 100 allows the management unit 531 to determine the authenticity of a user based on the biological information D30 based on a biological characteristic. Then, if determining the user as an authentic user, the management unit 531 removes restriction on access to the confidential information X1. In this way, authenticity of a user is determined based on a biological characteristic in order to decide whether access is permitted or not, and thus the security of the display system 100 can be further enhanced. Note that, as described above, once the restriction on access is removed, the image display unit 21 displays an image, and thus, the authentic user can visually recognize the image.

Although, in the above description, both the image based on the confidential information X1 and the image based on the image information D40 can be displayed based on the authenticity determination result for a user by the management unit 531, only the image based on the confidential information X1 may be displayed. In this case, similarly to the management unit 531 of the server 5, the control unit 26 of the display device 1 may be configured to determine the authenticity of a user, and, based on the result of the determination, the image display unit 21 may display the image based on the image information D40. Further, in this case, a biological characteristic used for access to confidential information X1 and a biological characteristic used for displaying images based on the image information D40 may be different from each other. For example, while fingerprint authentication can be employed for access to the confidential information X1, iris authentication can be employed for displaying images based on the image information D40.

2. Second Embodiment

Figure 4:
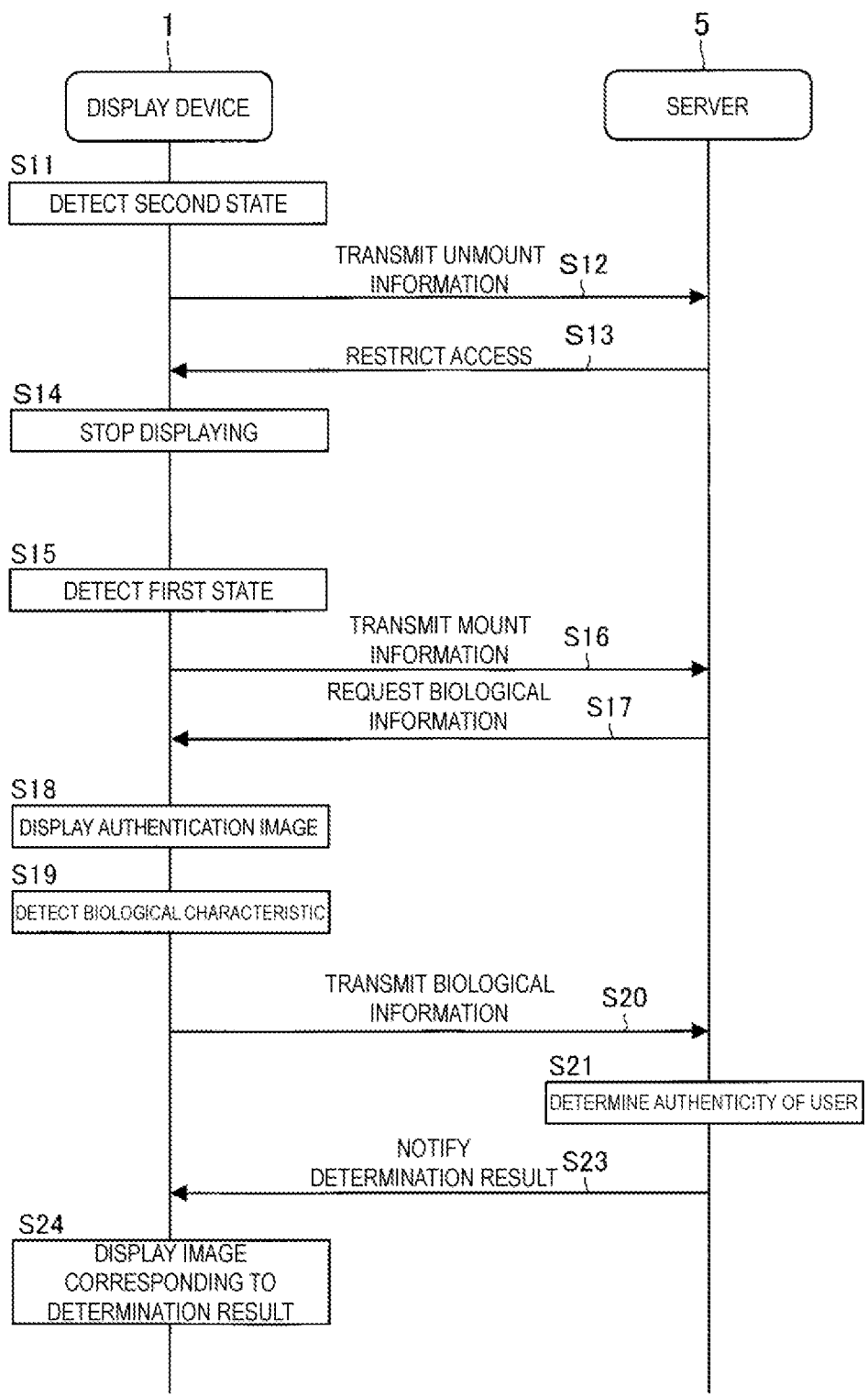
FIG. 4 is a sequence chart for illustrating a display control method in a second embodiment.
Figure 5:
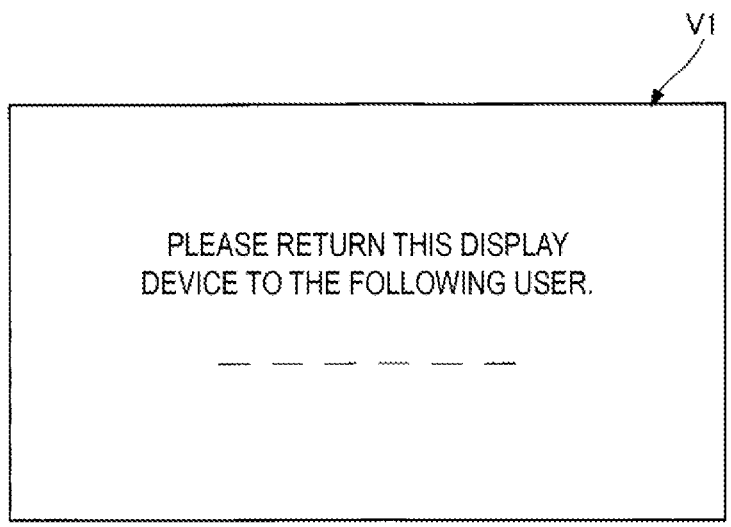
FIG. 5 is an example of an image for prompting a person to return the display device to a user according to the second embodiment.

Next, a second embodiment of the present disclosure will be described. FIG. 4 is a sequence chart for illustrating an operational example of the display system in the second embodiment. FIG. 5 is an example of an image for prompting a person to return the display device to a user according to the second embodiment.

The embodiment is the same as the first embodiment, except that the display device displays an image corresponding to an authenticity determination result for a user. Note that, the following descriptions focus on differences between the embodiment and the first embodiment and thus descriptions of similar matters will be omitted. Further, in FIG. 4, the same reference numbers are given to the same configurations as in the first embodiment.

In the display control method illustrated in FIG. 4, when the management unit 531 of the server 5 determines the authenticity of a user in step S21, the communication unit 24 of the server 5 notifies the display device 1 of the determination result in step S23. Once the information reception unit 242 of the display device 1 receives the determination result, the display control unit 261 of the display device 1 displays an image corresponding to the determination result in step S24. For example, when the user is authentic, the image display unit 21, for example, under the control of the display control unit 261, displays an image which was displayed prior to step S11. On the other hand, when the user is not authentic, the image display unit 21 displays, under the control of the display control unit 261, an image for prompting the user to return the display device 1 to an authentic user. For example, as illustrated in FIG. 5, the image display unit 21 displays an image V1 indicating a content for prompting the user to return the display device 1 to an authentic user. Note that the image for prompting the user to return the display device 1 is not limited to the image V1, and may be in any display format.

In the embodiment, if the state detection unit 22 detects the first state in step S15, the characteristic detection unit 23 detects a biological characteristic in step S19, and in step S21, the management unit 531 determines the authenticity of the user of the display device 1 based on the biological information D30 being information based on the biological characteristic. Then, as described above, in step S24, the image display unit 21 displays an image corresponding to the determination result by the management unit 531.

In either case of an authentic user or non-authentic user, the image display unit 21 displays an appropriate image in accordance with the authenticity determination result by the management unit 531, and thus it is possible to enhance convenience of a user while ensuring the security and safety of the display system 100.

Further, as described above, when the management unit 531 determines that a user is not an authentic user, the image display unit 21 displays the image V1 for prompting the user to return the display device 1 in step S24.

The image V1 is displayed to prevent the display device 1 from being used by another person. The display of the image V1 is effective in a situation where a plurality of display devices 1 are used, and is particularly effective when the display devices 1 are used in a school or a factory, for example.

According to the embodiment described above, security of the display system 100 can also be enhanced, as in the first embodiment.

3. Third Embodiment

Figure 6:
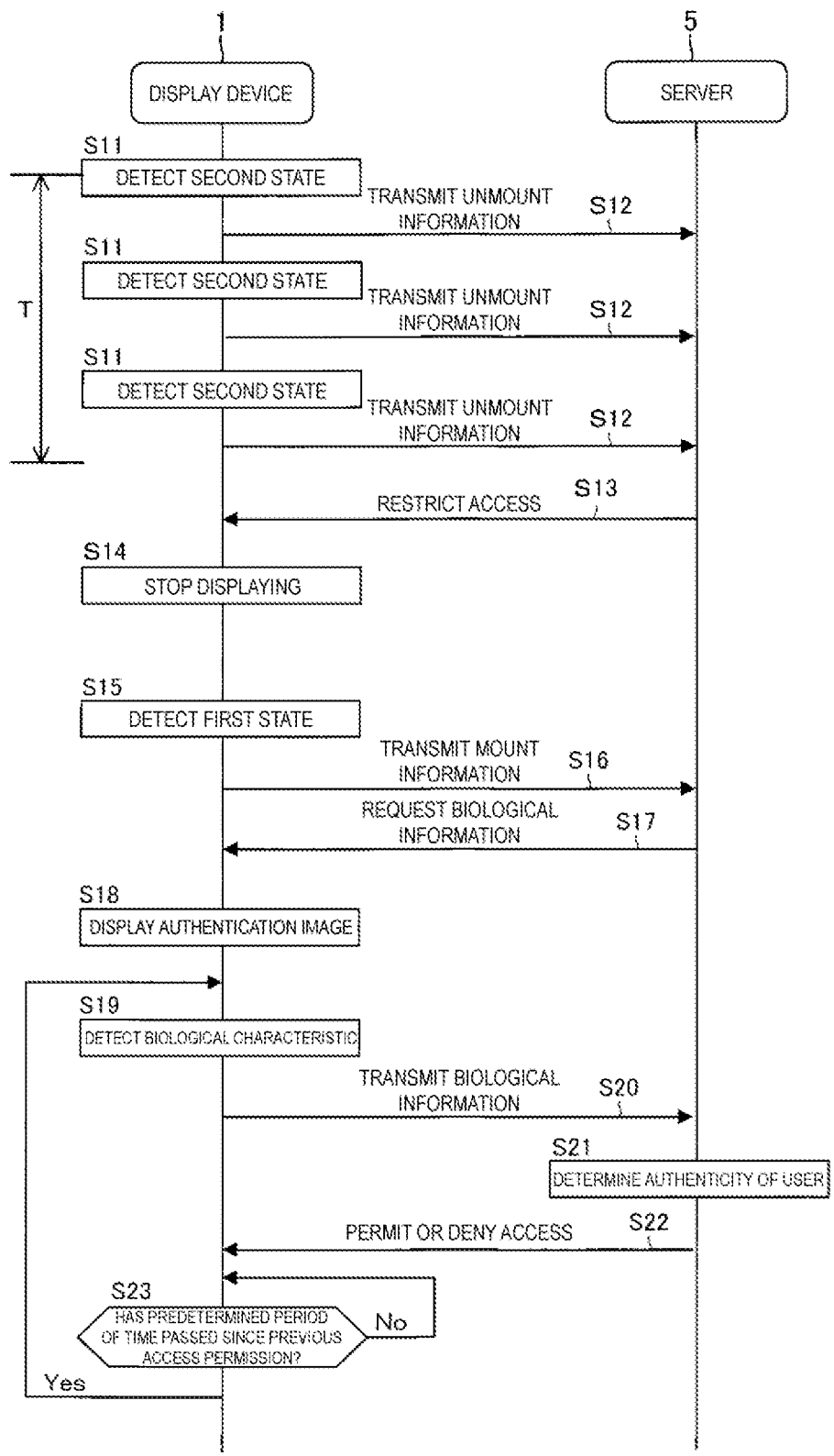
FIG. 6 is a sequence chart for illustrating a display control method in a third embodiment.

Next, a third embodiment of the present disclosure will be described. FIG. 6 is a sequence chart for illustrating an operational example of the display system in the third embodiment. Note that the characteristic detection unit 23 in the embodiment may detect a biological characteristic without any specific operation by the user (which corresponds to, for example, an aspect in which the iris is detected).

The embodiment is similar to the first embodiment, but those embodiments are mainly different in the following points. Namely, in the embodiment, the detection of the second state is performed a plurality of times, and the authenticity of a user is determined a plurality of times. Note that, the following descriptions focus on differences between the embodiment and the first embodiment, and thus, descriptions of similar matters will be omitted. Further, in FIG. 6, the same reference numbers are given to the same configurations as in first embodiment.

In the display control method illustrated in FIG. 6, the detection of the second state in step S11 and the transmission of the unmount information D20 in step S12 are performed a plurality of times within a predetermined period of time T. The predetermined period of time T begins when the second state is detected. Further, the end of the predetermined period of time T can be arbitrarily set.

When the information transmission unit 241 transmits the unmount information D20 a plurality of times within the predetermined period of time T, the management unit 531 restricts access to the confidential information X1 by the display device 1 in step S13. Note that, the aforementioned "plurality of times" is three times in the illustrated example, but the "plurality of times" may be two times or four or more times.

The embodiment in which the management unit 531 receives the second state a plurality of times before restricting access allows for more highly reliable detection of the second state by the state detection unit 22, compared to when the management unit 531 restricts access based on a single reception of the second state. Thus, it is possible to reduce access restrictions unintended by a user.

Further, in the embodiment, the processes of steps S19 to S23 are repeated periodically. In other words, the characteristic detection unit 23 is configured to periodically detect a biological characteristic, and the management unit 531 is configured to periodically determine the authenticity of a user. Specifically, the characteristic detection unit 23 determines, in step S23, whether a predetermined period of time has passed since the previous access permission, and repeats the determination until the predetermined period of time has passed. Then, when the determination result is "Yes", the process returns to step S19. As a result, processes of steps S19 to S23 are performed periodically.

The periodic detection of a biological characteristic and the periodic determination of authenticity of a user by the management unit 531 based on the biological characteristic allow for enhanced security of the display system 100. Note that steps S19 to S22 may be irregularly performed.

According to the embodiment described above, security of the display system 100 can also be enhanced, as in the first embodiment.

4. Fourth Embodiment

Figure 7:
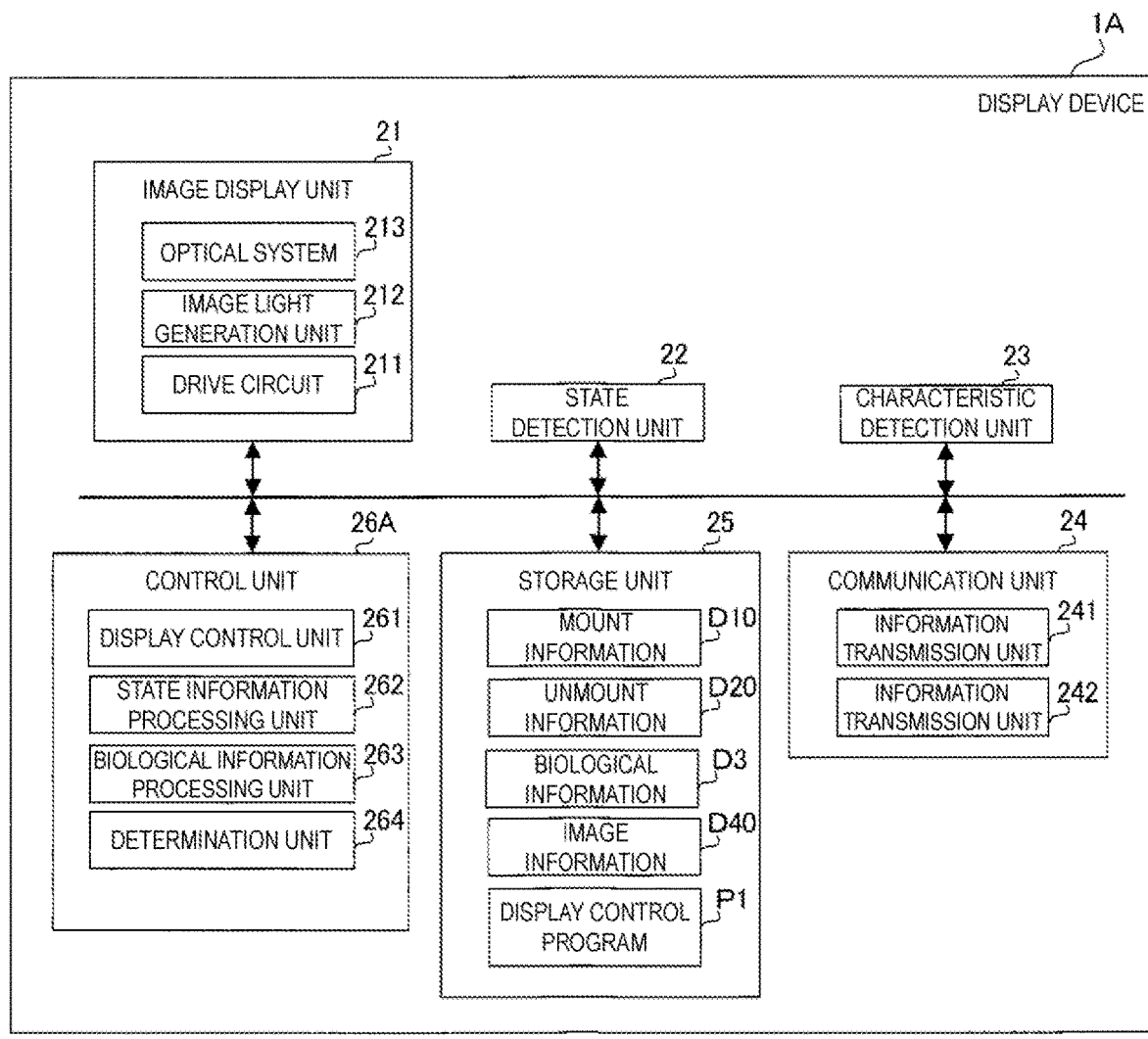
FIG. 7 is a block diagram of a display device in a fourth embodiment.
Figure 8:
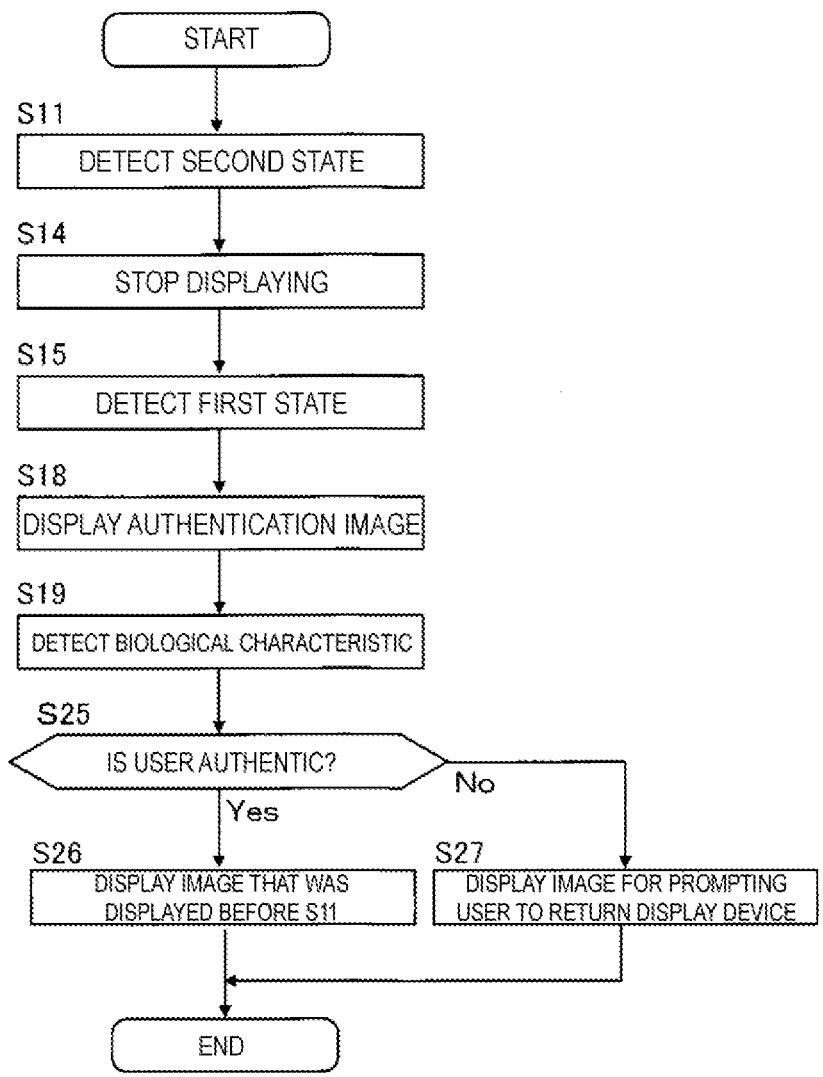
FIG. 8 is a flowchart for illustrating the display device in the fourth embodiment.

Next, a fourth embodiment of the present disclosure will be described. FIG. 7 is a block diagram of a display device in the fourth embodiment. FIG. 8 is a sequence chart for illustrating an operational example of the display device in the fourth embodiment.

The embodiment is similar to the first embodiment, but those embodiments are mainly different in the following points. Namely, in the embodiment, the server is not present and the display device includes a determination unit. Note that, the following descriptions focus on differences between the embodiment and the first embodiment, and thus, descriptions of similar matters will be omitted. Further, in FIGS. 7 and 8, the same reference numbers are given to the same configurations as in the first embodiment.

A control unit 26A included in a display device 1A illustrated in FIG. 7 includes a determination unit 264. The determination unit 264 is configured to determine the authenticity of a user of the display device 1. Specifically, the determination unit 264 is configured to determine the authenticity of the user based on information based on a biological characteristic detected by the characteristic detection unit 23 and the biological information D3 stored in the storage unit 25.

As illustrated in FIG. 8, in the display control method by the display device 1A, when the state detection unit 22 detects the second state in step S11, the display control unit 261 of the display device 1A stops displaying the image in step S14. Thereafter, when the state detection unit 22 detects the first state in step S15, the image display unit 21 displays the authentication image in step S18. Furthermore, in step S19, the characteristic detection unit 23 detects a biological characteristic of the user. Then, in step S25, the determination unit 264 determines the authenticity of the user. When the determination unit 264 determines that the user is authentic, the image display unit 21 displays, under the control of the display control unit 261, the image which was displayed prior to step S11, in step S26. On the other hand, when the determination unit 264 determines that the user is not authentic in step S25, the image display unit 21 displays, under the control of the display control unit 261, the image V1 illustrated in FIG. 5 for prompting the user to return the display device 1A, in step S27. Note that, in step S27, the display control unit 261 may only continue to stop displaying while not causing the image display unit 21 to display the image V1.

In the embodiment, similarly to the first embodiment, the user is unable to use various information including the image information D40 stored in the display device 1A. Therefore, security of the display device 1A can be enhanced.

The head-mounted display device and the display system of the present disclosure have been described above based on the preferred embodiments, but the present disclosure is not limited to the embodiments described above. In addition, the configuration of each component of the present disclosure may be replaced with any configuration that exerts the equivalent functions of the above-described embodiments, and to which any configuration may be added.

Further, the head-mounted display device of the present disclosure may not necessarily include the "characteristic detection unit" as long as the head-mounted display device includes at least the mounting portion, the image display unit, the state detection unit, and the display control unit. Further, the display system of the present disclosure may not necessarily include the "characteristic detection unit" as long as the display system includes the image display unit, the state detection unit, the information transmission unit, and the management unit.

What is claimed is:

1. A head-mounted display device comprising:
a mounting portion configured to be attached to a head of a user;
an image display unit that is disposed in the mounting portion and that displays an image to be visually recognized by the user;
a state detection unit that detects a first state in which the mounting portion is attached to the head and a second state in which the mounting portion is detached from the head; and
a display control unit that causes the image display unit to stop displaying the image when the state detection unit detects the second state a plurality of times within a predetermined period of time.

2. The head-mounted display device according to claim 1, further comprising an information transmission unit that transmits unmount information indicating the second state, when the state detection unit detects the second state.

3. A display system comprising:
a head-mounted display device configured to be attached to a head of a user and that includes:
an image display unit displaying an image to be visually recognized by the user;
a state detection detecting a first state in which the head-mounted display device is attached to the head and a second state in which the head-mounted display device is detached from the head; and
an information transmission unit transmitting unmount information indicating the second state, when the state detection unit detects the second state; and
a server that communicates with the head-mounted display device and that includes a management unit restricting access of the head-mounted display device when the server receives the unmount information transmitted from the information transmission unit,
wherein the management unit restricts the access when the information transmission unit transmits the unmount information a plurality of times within a predetermined period of time.

4. The display system according to claim 3, wherein the head-mounted display device includes a characteristic detection unit that detects a biological characteristic of the user.

5. The display system according to claim 4, wherein
the characteristic detection unit detects the biological characteristic when the state detection unit detects the first state,
the management unit determines authenticity of the user based on the biological characteristic, and
the image display unit displays an image corresponding to a result of determination by the management unit.

6. The display system according to claim 5, wherein the image display unit displays an image for prompting the user to return the head-mounted display device, when the management unit denies the authenticity of the user.

7. The display system according to claim 5, wherein
the characteristic detection unit periodically detects the biological characteristic, and
the management unit periodically determines the authenticity of the user.

* * * * *